US007478109B1

(12) United States Patent
Panigrahy et al.

(10) Patent No.: US 7,478,109 B1
(45) Date of Patent: Jan. 13, 2009

(54) IDENTIFICATION OF A LONGEST MATCHING PREFIX BASED ON A SEARCH OF INTERVALS CORRESPONDING TO THE PREFIXES

(75) Inventors: Rina Panigrahy, Sunnyvale, CA (US); Abhijit Patra, San Jose, CA (US); Samar Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 10/801,907

(22) Filed: Mar. 15, 2004

(51) Int. Cl.
    *G06F 7/02* (2006.01)
(52) U.S. Cl. .................................. 707/104.1; 707/6
(58) Field of Classification Search ............ 707/104.1, 707/6
    See application file for complete search history.

(56) References Cited

U.S. PATENT DOCUMENTS

| 5,088,032 | A | 2/1992 | Bosack ..................... 395/200 |
|---|---|---|---|
| 5,528,701 | A | 6/1996 | Aref ........................ 382/178 |
| 5,651,099 | A | 7/1997 | Konsella ................... 395/13 |
| 5,721,899 | A | 2/1998 | Nambia ..................... 395/603 |
| 5,740,171 | A | 4/1998 | Mazzola et al. ............ 370/392 |
| 5,781,431 | A | 7/1998 | Duret et al. ................ 700/28 |
| 5,781,772 | A | 7/1998 | Wilkinson, III et al. ..... 395/600 |
| 5,809,501 | A | 9/1998 | Noven ....................... 707/7 |
| 5,829,004 | A | 10/1998 | Au .......................... 707/100 |
| 5,848,416 | A | 12/1998 | Tikkanen .................. 707/101 |
| 5,857,196 | A | 1/1999 | Angle et al. |
| 5,884,297 | A | 3/1999 | Noven ....................... 707/1 |
| 5,920,857 | A | 7/1999 | Rishe et al. |
| 5,920,886 | A | 7/1999 | Feldmeier .................. 711/108 |
| 5,995,971 | A | 11/1999 | Douceur et al. ............ 707/100 |
| 6,018,524 | A | 1/2000 | Turner et al. ............... 370/392 |
| 6,041,053 | A | 3/2000 | Douceur et al. ............ 370/389 |
| 6,067,574 | A | 5/2000 | Tzeng ....................... 709/247 |
| 6,115,716 | A | 9/2000 | Tikkanen et al. ........... 707/100 |
| 6,141,738 | A | 10/2000 | Munter et al. .............. 711/206 |
| 6,236,658 | B1 | 5/2001 | Essbaum et al. ............ 370/401 |

(Continued)

OTHER PUBLICATIONS

U.S. Appl. No. 10/165,590, filed Jun. 8, 2002, Panigraphy et al.

(Continued)

*Primary Examiner*—Don Wong
*Assistant Examiner*—Angela M Lie
(74) *Attorney, Agent, or Firm*—The Law Office of Kirk D. Williams

(57) ABSTRACT

A longest matching prefix is identified based on a search of ranges corresponding to the prefixes. These prefixes may correspond to any values, such as, but not limited to Internet Protocol (IP) or other network addresses, character strings, etc. A first-level tiny tree is traversed to identify a next-level tiny tree. A root node of the next-level tiny tree is retrieved. The root node typically includes a back value to identify a matching prefix should no matching prefix be identified within said particular tree. The particular next-level tiny tree is traversed to either identify a matching prefix or a no match condition, with the traversing said particular next-level tiny tree typically including comparing the lookup value with one or more of the plurality of keys. The prefix identified based on the back value is identified as the longest matching prefix if said traversing resulted in said no match condition else the matching prefix.

8 Claims, 16 Drawing Sheets

U.S. PATENT DOCUMENTS

| | | | |
|---|---|---|---|
| 6,237,061 B1 | 5/2001 | Srinivasan et al. | 711/108 |
| 6,243,667 B1 | 6/2001 | Kerr et al. | 703/27 |
| 6,289,414 B1 | 9/2001 | Feldmeier et al. | 711/108 |
| 6,295,576 B1 | 9/2001 | Ogura et al. | 711/108 |
| 6,298,339 B1 | 10/2001 | Bjornson | 707/3 |
| 6,334,153 B2 | 12/2001 | Boucher et al. | 709/230 |
| 6,341,346 B1 | 1/2002 | Benayoun et al. | |
| 6,356,951 B1 | 3/2002 | Gentry, Jr. | 709/217 |
| 6,374,326 B1 | 4/2002 | Kansal et al. | |
| 6,377,577 B1 | 4/2002 | Bechtolsheim et al. | |
| 6,389,506 B1 | 5/2002 | Ross et al. | |
| 6,560,610 B1 * | 5/2003 | Eatherton et al. | 707/104.1 |
| 6,564,211 B1 | 5/2003 | Andreev et al. | |
| 6,658,002 B1 | 12/2003 | Ross et al. | |
| 6,717,946 B1 | 4/2004 | Hariguchi et al. | |
| 6,725,326 B1 | 4/2004 | Patra et al. | |
| 6,741,985 B2 | 5/2004 | Green | |
| 6,775,737 B1 | 8/2004 | Warkhede et al. | |
| 6,862,281 B1 | 3/2005 | Chandrasekaran | |
| 2004/0258061 A1 * | 12/2004 | Sahni et al. | 370/389 |
| 2005/0242976 A1 * | 11/2005 | Rhoades | 341/106 |

OTHER PUBLICATIONS

Lampson et al., "IP Lookups Using Multiway and Multicolumn Search," IEEE Transactions on Networking, vol. 7, No. 3, Jun. 1999, pp. 324-334.

Srinivasan et al., "Fast Address Lookups Using Controlled Prefix Expansion," ACM Transaction on Computer Systems, vol. 17, Issue 1, pp. 1-40, Feb. 1999.

Doeringer et al., Routing on longest-matching prefixes, IEEE/ACM Transactions on Networking, vol. 4, No. 1, pp. 86-97, Feb. 1996.

Uga et al., "A Fast And Compact Longest Match Prefix Look-Up Method Using Pointer Cache For Very Long Network Address," Computer Communications and Networks, Eighth International Conference, pp. 595-602, 1999.

Donald R. Morrison, "PATRICIA—Practical Algorithm to Retrieve Information Coded in Alphanumeric," Journal of the ACM, vol. 15, No. 4, Oct. 1968, pp. 514-534.

Woldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26, No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetoworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999, (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

LOOKUP

ADD ENDPOINT

INSERT

**UPDATE BACK VALUES

IDENTIFICATION OF A LONGEST MATCHING PREFIX BASED ON A SEARCH OF INTERVALS CORRESPONDING TO THE PREFIXES

TECHNICAL FIELD

One embodiment of the invention relates to communications and computer systems, especially networked routers, packet switching systems, and other devices; and more particularly, one embodiment relates to the identification of a longest matching prefix based on a search of intervals corresponding to the prefixes.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

IP forwarding requires a longest matching prefix computation at wire speeds. The current IP version, IPv4, uses 32 bit destination addresses and a core Internet router can have over 200,000 prefixes. A prefix is typically denoted by a bit string (e.g., 01*) followed by a '*' to indicate the value of these trailing bits does not matter. For destination routing, each prefix entry in a routing table typically consists of a prefix and a next hop value. For example, suppose the database consists of only two prefix entries (01*-->L1; 0100*-->L2). If the router receives a packet with destination address that starts with 01000, the address matches both the first prefix (01*) and the second prefix (0100*). Because the second prefix is the longest match, the packet should be sent to next hop L2. On the other hand, a packet with destination address that starts with 01010 should be sent to next hop L1. The next hop information will typically specify an output port on the router and possibly a data link address.

FIG. 1A illustrates an example of a set of prefixes P1-9 shown as nodes 1A-9A in table 10A and as nodes 1B-9B in unibit trie 10B. Also shown in unibit trie 10B are placeholder/vacant nodes 11B-18B, which represent non-matching nodes (i.e., nodes that are not possible results as a longest matching prefix.) For example, a string of 1110000 matches prefixes P1 (1B), P2 (2B) and P5 (5B), with the longest matching prefix being P5 (B5).

One known approach is typically referred to as "tree bitmap", described in Eatherton et al., "Data Structure Using a Tree Bitmap and Method for Rapid Classification of Data in a Database," U.S. Pat. No. 6,560,610, issued May 6, 2003, which is hereby incorporated by reference. Tree bitmap is a multibit trie algorithm that implements a representation of the trie by grouping nodes into sets of strides. A stride is typically defined as the number of tree levels of the binary trie that are grouped together or as the number of levels in a tree accessed in a single read operation representing multiple levels in a tree or trie. FIG. 1B illustrates one such partitioning of nodes P1-P9 (1B-9B) and vacant nodes 11B-18B (FIG. 1A) into strides 20-25. In this example, the stride is of size three.

In a known implementation of the tree bitmap algorithm, all child nodes of a given trie node are stored contiguously, which allows the use of just one pointer for all children (the pointer points to the start of the child node block), as each child node can be calculated as an offset from the single pointer. This can reduce the number of required pointers and cuts down the size of trie nodes.

In addition, there are two bit maps per trie node, one for all the internally stored prefixes and one for the external pointers. The internal bit map has a 1 bit set for every prefix stored within this node. Thus, for an r-bit trie node, there are $(2^r)-1$ possible prefixes of lengths less than r, and hence, a $(2^r)-1$ bit map is used. The external bit map contains a bit for all possible $2^r$ child pointers. A trie node is of fixed size and only contains an external pointer bit map, an internal next hop information bit map, and a single pointer to the block of child nodes. The next hops associated with the internal prefixes are stored within each trie node in a separate array associated with this trie node. For memory allocation purposes, result (e.g., leaf) arrays are normally an even multiple of the common node size (e.g., with 16-bit next hop pointers, and 8-byte nodes, one result node is needed for up to four next hop pointers, two result nodes are needed for up to 8, etc.) Putting next hop pointers in a separate result array potentially requires two memory accesses per trie node (one for the trie node and one to fetch the result node for stored prefixes). A simple lazy strategy to not access the result nodes till the search terminates is typically used. The result node corresponding to the last trie node encountered in the path that contained a valid prefix is then accessed. This adds only a single memory reference at the end besides the one memory reference required per trie node.

FIG. 1C illustrates one representation of a tree bitmap implementation of the prefix example shown in FIGS. 1A-B. As shown, root node 30 represents the first level trie. Child pointer 31 connects root node 30 to child array 40 containing the second level strides. In level 3, there are two child arrays 50 and 60, which are connected from child array 40 respectively by child pointers 41 and 42.

A longest prefix match is found by starting with the root node. The first bits of the destination address (corresponding to the stride of the root node, three in this example) are used to index into the external bit map at the root node at say position P. If a 1 is located in this position, then there is a valid child pointer. The number of 1's not including and to the left of this 1 (say I) is determined. Because the pointer to the start position of the child block (say C) is known and the size of each trie node (say S), the pointer to the child node can be computed as C+(I*S).

Before moving on to the child, the internal bit map is checked to see if there is a stored prefix corresponding to position P. To do so, imagine successively remove bits of P starting from the right and index into the corresponding position of the internal bit map looking for the first 1 encountered. For example, suppose P is 101 and a three bit stride is used at the root node bit map. The right most bit is first removed which results in the prefix 10*. Because 10* corresponds to the sixth bit position in the internal bit map, a check is made to determine if there is a 1 in that position. If not, the right most two bits (resulting in the prefix 1*) are removed. Because 1* corresponds to the third position in the internal bit map, a check is made to determine if a 1 is there. If a 1 is found there, then the search ends. If a 1 is not found there, then the first three bits are removed and a search is performed for the entry corresponding to * in the first entry of the internal bit map.

Once it has been determined that a matching stored prefix exists within a trie node, the information corresponding to the next hop from the result node associated with the trie node is not immediately retrieved. Rather, the number of bits before the prefix position is counted to indicate its position in the result array. Accessing the result array would take an extra memory reference per trie node. Instead, the child node is examined while remembering the stored prefix position and the corresponding parent trie node. The intent is to remember the last trie node T in the search path that contained a stored prefix, and the corresponding prefix position. When the search terminates (i.e., a trie node with a 0 set in the corresponding position of the external bit map is encountered), the result array corresponding to T at the position already computed is accessed to read off the next hop information.

In hardware implementations, the memory access speeds are generally the bottleneck as opposed to node processing time. A typical implementation of a hardware based tree bitmap lookup engine uses multiple memory channels to store the tree bitmap data structure. In this case the tree bitmap nodes are spread out across the memory channels in such a way that per lookup, successive nodes accessed fall in different memory channels. If a single memory channel can sustain 'x' accesses per second, then with multiple lookups in progress simultaneously, 'x' lookups per second on average can be achieved provided each memory channel is accessed at most once per lookup. If any of the channels is accessed twice per lookup, then the packet forwarding rate drops by half because that particular channel becomes the bottleneck.

Another known approach for performing lookup operations is described in Wilkinson, III et al., U.S. Pat. No. 5,781,772, issued Jul. 14, 1998, which is hereby incorporated by reference. Wilkinson, III et al., describes a previous system in which each node has an array of n number of pointers, wherein n is the number of possible next possible values that can occur in an input string. Additionally, Wilkinson, III et al. describes uncompressed and compressed routing data structures.

In another known prior approach, sometimes referred to as "mtree" or "mtrie", the next child node of a parent node during a lookup operation is determined by an offset value corresponding to a next bit or stride of a lookup value from a common base pointer. Thus, if the next value is 138, the child node is located at base pointer+138× the size of a node. For 16 bit stride, this requires each parent node to have a unique, non-overlapping memory block of 64K entries (i.e., nodes)× the size of a node. This typically wastes a lot of space as these memory blocks are often sparsely populated. Moreover, each entry must be populated with the value of a node or an indication that no child node exists.

The approaches previously described perform searches based on a Patricia tree representation of the prefix space. A different approach for identifying a longest prefix match is described in Lampson et al., "IP Lookups Using Multiway and Multicolumn Search," IEEE/ACM Transactions on Networking, Vol. 7, No. 3, June 1999, which is hereby incorporated by reference. Lampson et al. treats a prefix as a range and encodes it using the start and end of range, and describes techniques for performing binary and multiway searches to identify a longest prefix match for an input IP address.

FIG. 1D visually illustrates a set of prefixes 100, which include prefixes 101-106. As shown, the longer matching prefixes are contained within boundaries identified by shorter prefixes contained within the longer matching prefix. For example, prefix 105 is longer than prefix 104, which is longer than prefix 103, which is longer than prefix 101. For example, prefix 101 could represent the IP address of 10.*.*.*, prefix 103 represent 10.3.*.*, and so on. The possible value of input values is divided upon matching ranges 110 based on prefixes 101-106, with the individual matching ranges 111 corresponding to prefix 101, range 112 corresponding to prefix 102, ranges 113 corresponding to prefix 103, ranges 114 corresponding to prefix 104, range 115 corresponding to prefix 105, and range 116 corresponding to prefix 106. Note, there are two ranges 113 for prefix 103 because there are longer matching prefixes 104, 105, 106. Thus, finding a range 111-116 matching an input value identifies the corresponding longest matching prefix 101-106. As such the mapping of the ranges to their respective longest matching prefix can be pre-computed. However, a problem with this technique as acknowledged within Lampson et al. is that as presented, it does not provide an efficient mechanism to update the search space, which is a major obstacle for use in a network as routing tables are typically continuously updated.

SUMMARY

Disclosed are, inter alia, methods, apparatus, data structures, computer-readable medium, mechanisms, and means for identification of a longest matching prefix based on a search of intervals corresponding to the prefixes. These prefixes may correspond to any values, such as, but not limited to Internet Protocol (IP) or other network addresses, character strings.

One embodiment determines which particular first-level tiny tree of multiple first-level tiny trees to search based on a lookup value. A first-level root node of the particular first-level tiny tree is retrieved, with the first-level root node including multiple first-level keys. The particular first-level tiny tree is traversed to identify a next-level tiny tree, which typically includes comparing the lookup value with one or more of the first-level keys. The first-level tiny tree and the next-level tiny trees are typically independent trees, and not subtrees of a larger tree. A root node of the next-level tiny tree is retrieved. The root node typically includes multiple keys to compare with the lookup value and a back value to identify a matching prefix should no matching prefix be identified within said particular tree. The particular next-level tiny tree is traversed to either identify a matching prefix or a no match condition, with the traversing said particular next-level tiny tree typically including comparing the lookup value with one or more of the keys. The prefix identified based on the back value is identified as the longest matching prefix if said traversing resulted in said no match condition else the matching prefix.

One embodiment uses one or more data structures stored on one or more computer-readable medium. The data structures include (a) a hierarchy of tiny trees on which binary or multicolumn searches are performed and (b) multiple indirect back values for identifying a match when a range is outside that represented in a particular tiny tree. These tiny trees typically include a current-level tiny tree and a next-level tiny tree. The current-level tiny tree references the second-level tiny tree for one or more possible lookup values. The next-level tiny tree includes a back value for identifying a matching range whose match value is not represented within the next-level tiny tree. The back value references a particular indirect back value of the multiple indirect back values, and at least one other indirect back value references a same result as the particular indirect back value. In one embodiment, for each particular tiny tree, at least the first m bits of the matching value of each entry within the same particular tiny tree are the same, with m being at least four. In one embodiment, m is at least twelve.

One embodiment adds a prefix having a first endpoint and a second endpoint to a hierarchy of tiny trees, with the first endpoint residing in a first tiny tree and the second endpoint residing in the second tiny tree. The first tiny tree is updated to identify the prefix for one or more first portions in the first tiny tree corresponding to where there are no prefixes longer than the prefix. The second tiny tree is updated to identify the prefix for one or more second portions in the second tiny tree corresponding to where there are no prefixes longer than the prefix. A first back value corresponding to the first tiny tree is updated to reflect the prefix. A second back value corresponding to the second tiny tree is updated to reflect the prefix.

In one embodiment, the first and second back values reference a same result value corresponding to the prefix. In one embodiment, the first and second back values reference different result values corresponding to the prefix. In one embodiment, updating the first tiny tree includes splitting the first tiny tree into the first tiny tree and a third tiny tree. In one embodiment, a third back value is associated with the third tiny tree, and the value of the third back value is the value of the first back value prior to performing said updating the first back value.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
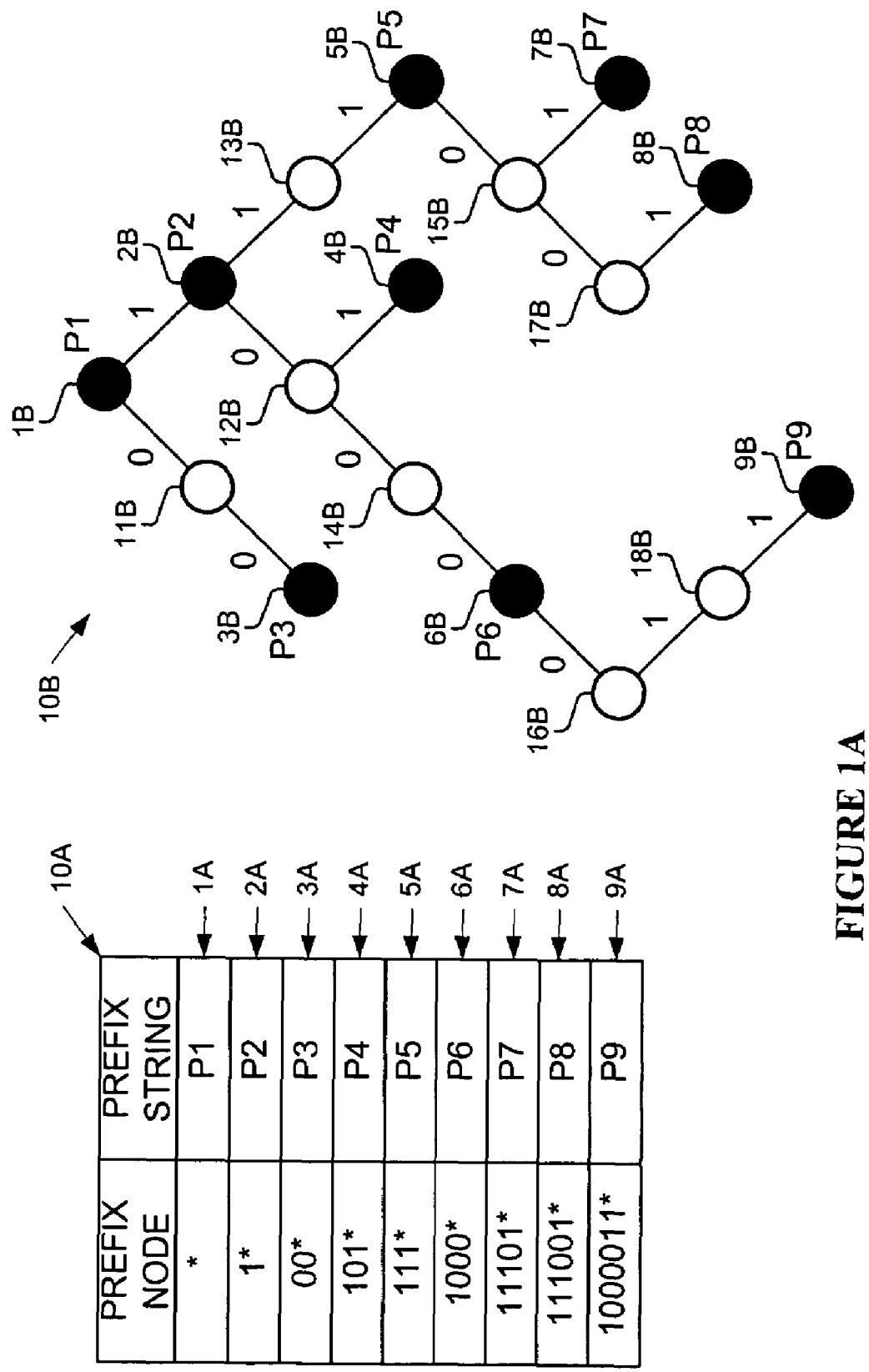
FIGS. 1A-1D illustrate prior art techniques for identifying a longest matching prefix.
Figure 1B:
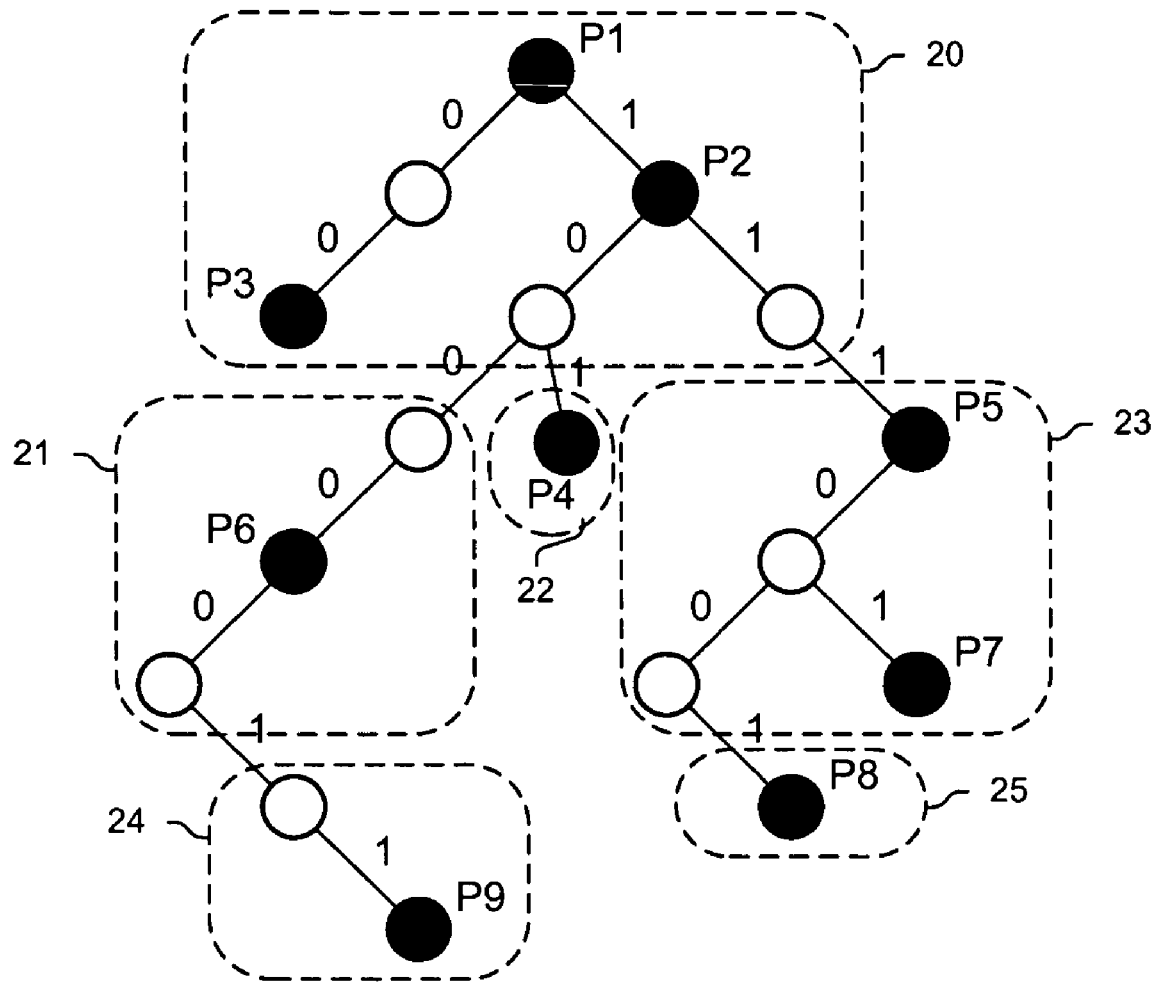
Figure 1C:
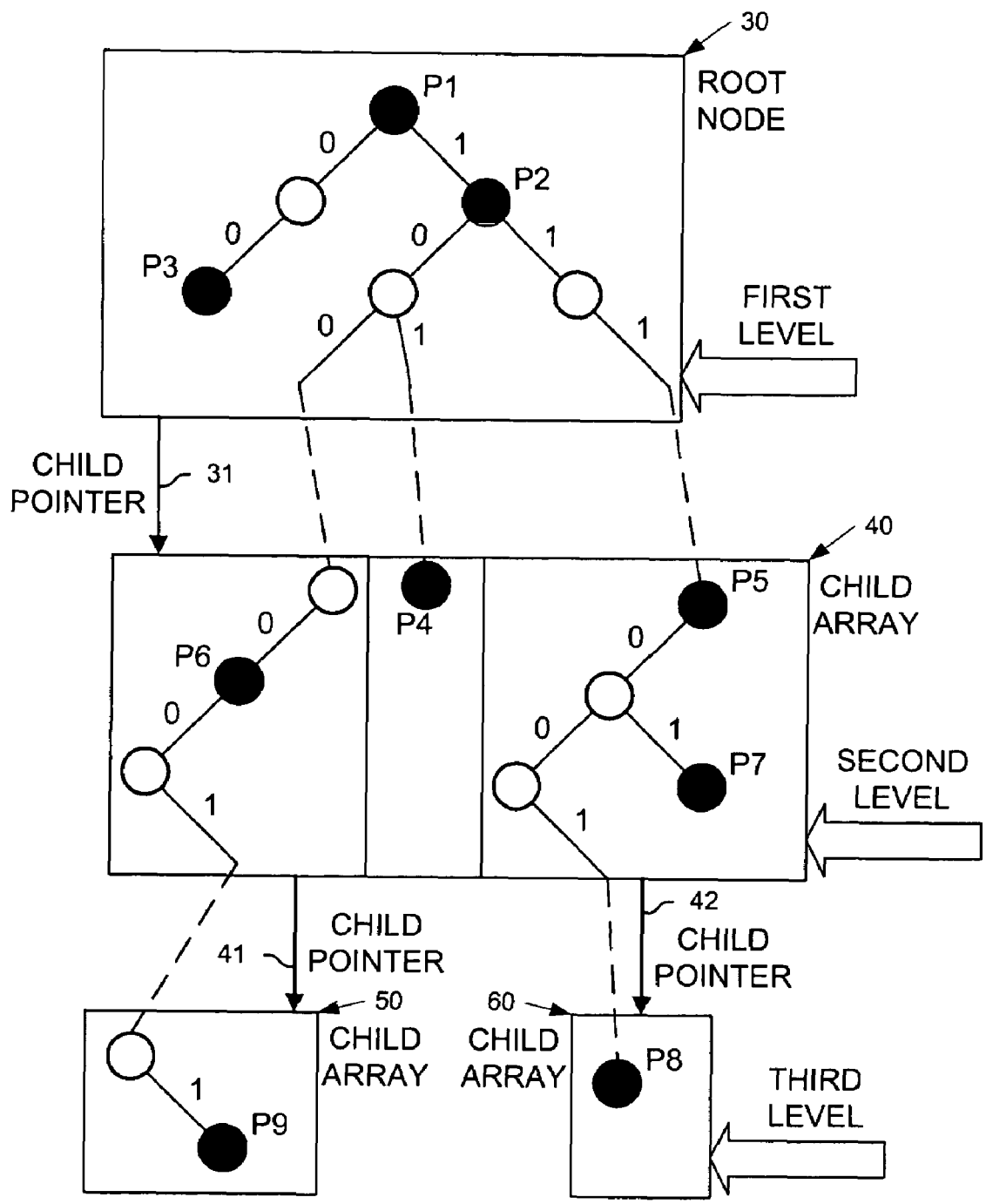
Figure 1D:
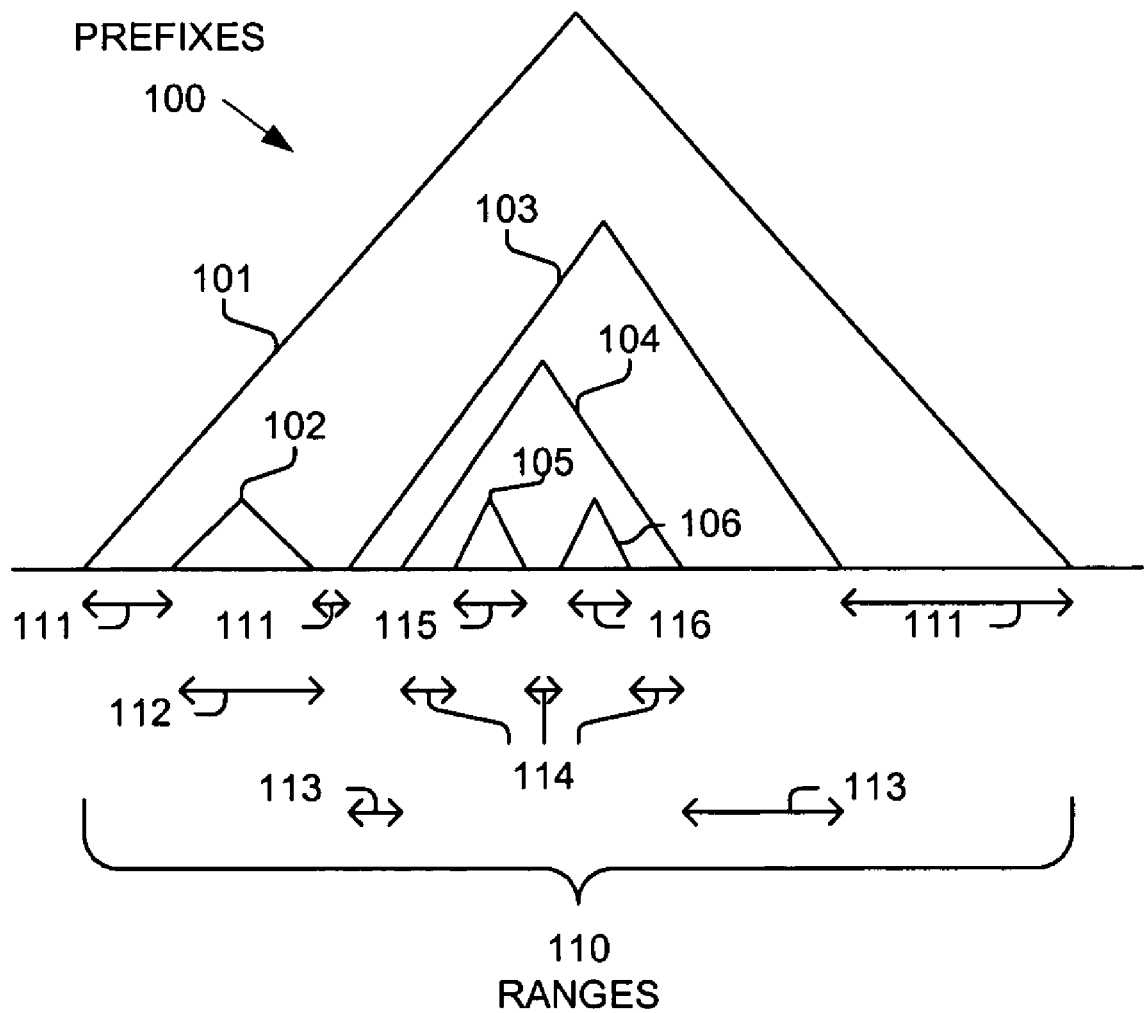

Disclosed are, inter alia, methods, apparatus, data structures, computer-readable medium, mechanisms, and means for identifying of a longest matching prefix based on a search of intervals corresponding to the prefixes.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for identification of a longest matching prefix based on a search of intervals corresponding to the prefixes. These prefixes may correspond to any values, such as, but not limited to Internet Protocol (IP) or other network addresses, character strings.

One embodiment uses a hierarchy of tiny trees to identify a longest prefix matching a lookup value. After the data structure is populated, a binary or multicolumn search is performed and the hierarchy of tiny trees is traversed. The use of tiny trees enables the used of pointers relative to the tiny trees and to keep the tiny tree compacted. Thus, a large number of comparison values can be stored in each tiny tree, which allows an increased branching factor within a tiny tree and thus reduces the height of the tiny tree. Therefore, a search can be performed with a reduced number of memory accesses which increases the speed of a lookup operation.

One embodiment determines which particular first-level tiny tree of multiple first-level tiny trees to search based on a lookup value. A first-level root node of the particular first-level tiny tree is retrieved, with the first-level root node including multiple first-level keys. The particular first-level tiny tree is traversed to identify a next-level tiny tree, which typically includes comparing the lookup value with one or more of the first-level keys. The first-level tiny tree and the next-level tiny trees are typically independent trees, and not subtrees of a larger tree. A root node of the next-level tiny tree is retrieved. The root node typically includes multiple keys to compare with the lookup value and a back value to identify a matching prefix should no matching prefix be identified within said particular tree. The particular next-level tiny tree is traversed to either identify a matching prefix or a no match condition, with the traversing said particular next-level tiny tree typically including comparing the lookup value with one or more of the keys. The prefix identified based on the back value is identified as the longest matching prefix if said traversing resulted in said no match condition else the matching prefix.

One embodiment uses one or more data structures stored on one or more computer-readable medium. The data structures include (a) a hierarchy of tiny trees on which binary or multicolumn searches are performed and (b) multiple indirect back values for identifying a match when a range is outside that represented in a particular tiny tree. These tiny trees typically include a current-level tiny tree and a next-level tiny tree. The current-level tiny tree references the second-level tiny tree for one or more possible lookup values. The next-level tiny tree includes a back value for identifying a matching range whose match value is not represented within the next-level tiny tree. The back value references a particular indirect back value of the multiple indirect back values, and at least one other indirect back value references a same result as the particular indirect back value. In one embodiment, for each particular tiny tree, at least the first m bits of the matching value of each entry within the same particular tiny tree are the same, with m being at least four. In one embodiment, m is at least twelve.

One embodiment adds a prefix having a first endpoint and a second endpoint to a hierarchy of tiny trees, with the first endpoint residing in a first tiny tree and the second endpoint residing in the second tiny tree. The first tiny tree is updated to identify the prefix for one or more first portions in the first tiny tree corresponding to where there are no prefixes longer than the prefix. The second tiny tree is updated to identify the prefix for one or more second portions in the second tiny tree corresponding to where there are no prefixes longer than the prefix. A first back value corresponding to the first tiny tree is updated to reflect the prefix. A second back value corresponding to the second tiny tree is updated to reflect the prefix.

In one embodiment, the first and second back values reference a same result value corresponding to the prefix. In one embodiment, the first and second back values reference different result values corresponding to the prefix. In one embodiment, updating the first tiny tree includes splitting the first tiny tree into the first tiny tree and a third tiny tree. In one embodiment, a third back value is associated with the third tiny tree, and the value of the third back value is the value of the first back value prior to performing said updating the first back value.

A prefix can be considered a set of all possible values, which can typically be mapped in such a way as all values in the set are contiguous, and thus, a prefix can be considered an interval or a range defined by two endpoints. If the prefix is fully expanded, then the two endpoints will be the same, otherwise, they will be distinct.

For example, an IPv4 address can be thought of as a point on a number line from 0 to $2^{32}$. Each prefix can be thought of as an interval with two endpoints. The IP addresses that match a prefix P form an interval on this number line. For example, 10.*.*.* matches all IP addresses in the interval [10.0.0.0, 10.255.255.255]. In this way, a routing table can be looked upon as a set of intervals.

An IP lookup involves performing a longest prefix match, or in other words, finding the longest prefix matching an IP address. If these prefixes are viewed as intervals, this operation is same as finding the shortest enclosing interval. To find the shortest enclosing interval, all the endpoints of all the interval are considered. The interval between two endpoints is often referred to herein as a tiny interval. Note, a particular prefix will typically have multiple tiny intervals associated with it when there are longer prefixes containing that prefix as its root. The interval formed by consecutive endpoints is typically referred to herein as a tiny interval. There is a well defined mapping between these tiny-intervals and the shortest enclosing prefix.

In one embodiment, the routing database is reduced by partitioning the address space into a large number of ranges. Given a key, if the tiny-interval containing the key is identified, then from the tiny-interval, the shortest enclosing interval can be determined and hence the longest matching prefix. With each tiny interval, one can pre-compute the mapping to the shortest enclosing interval. This mapping may need to be updated during route updates.

Finding the tiny-interval containing the lookup value involves finding the two consecutive endpoints between which the lookup value lies. This is a classic search problem that can be solved using a comparison based multi-way tree such as B-tree. A B-tree is a hierarchical data structure that involves many levels of comparison in order to reach the correct leaf node.

If a node that is only a few levels above the leaf can be directly reached, memory accesses for the previous levels would not be required. After traversing a certain number of levels, the search has essentially been narrowed down into a smaller range. So, this partial traversal is equivalent to locating the key among a collection of ranges. This allows us to view the search algorithm as a range search to identify a subset of intervals, followed by a tree walk to identify the corresponding interval, with one tree for each range.

In one embodiment, the number line is divided into T number of disjoint ranges so that each range gets about an equal number of endpoints. Given a query point (e.g., IP address, character string, etc.), the interval between which two consecutive endpoints it lies is identified. First, a range search is performed based on the T boundaries, to determine which partition it lies in. The boundaries of the range are typically referred to herein as partition points or a boundary prefix. This identified partition contains a small number of endpoints.

Figure 2A:
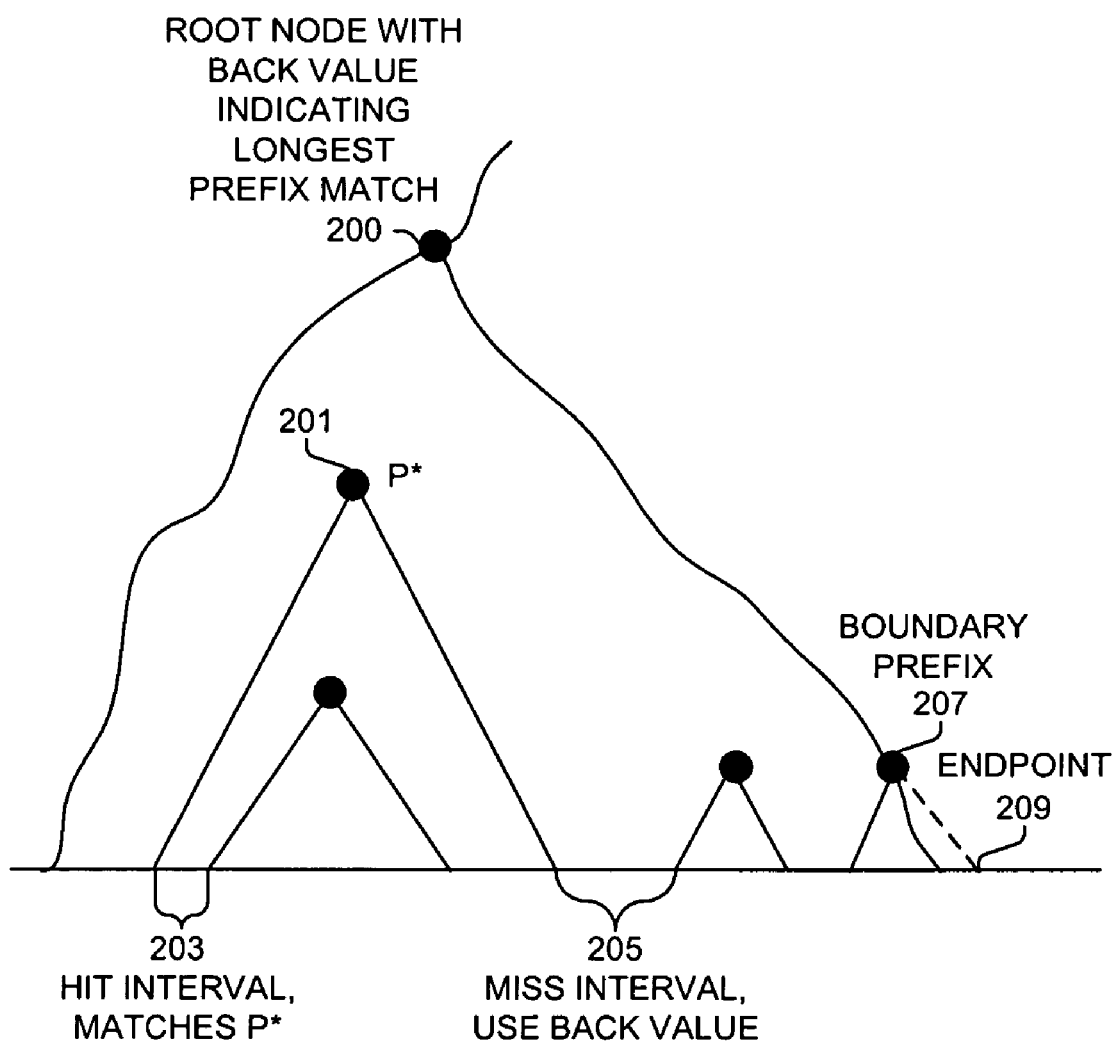
FIG. 2A is a block diagram illustrating a tiny tree, the use of a back value, and an identification of a longest matching prefix based on a matching interval as performed in one embodiment.

FIG. 2A illustrates a partition/tiny tree with node 200, prefix P* 201, and with boundary prefix 207 and partition endpoint 209. As shown, if a lookup value matches interval 203, then it matches prefix P* 201. However, if the lookup value matches interval 205, the matching prefix is not within the tiny tree shown, so the longest matching prefix is identified based on a back value associated with root node 200. This back value can be the prefix itself, or a pointer or other indirect reference to the corresponding longest matching prefix.

In one embodiment, the endpoints are represented in a tree data structure such that a binary or multi-way search can be performed. These trees are typically referred to herein as tiny trees as they typically contain a small number of nodes so as to reduce the size of a pointer used to identify a node, as well as to allow memory compaction of nodes. The size of a pointer can be reduced by using a relative value within a tiny tree instead of an absolute memory value. Also, one embodiment partitions tiny trees such that all entries in a tiny tree have a first m number of same bits (i.e., one or more bits). For example, if m is twelve, then you can save twelve bits per entry in each tiny tree. This partitioning may require additional tiny trees than otherwise needed (i.e., it may require 2 raised to the power of m tiny trees for each entry to have the same first m bits), but this allows for more compact nodes, which in turn allows for a large number of comparison values to be stored in each tiny tree, which in turn allows an increased branching factor within a tiny tree and thus reduces the height of the tiny tree. Therefore, a search can be performed with a reduced number of memory accesses which increases the speed of a lookup operation.

One embodiment uses a hierarchy of tiny trees, such that a tiny tree is traversed to identify a next independent tiny tree to traverse to either identify a next-level tiny tree or a leaf node. In one embodiment, these trees are independent (i.e., not subtrees of a larger tree or one being a subtree of a tree in another level). One embodiment searches each tree using a multi-way multi-column tree. However, embodiments may employ different data structures, such as, but not limited to encoding these tiny trees as uni-column and/or multi-column trees, as well as performing a binary or multi-way search in a particular tiny tree. Also, different encodings and/or searching techniques can be used for different tiny trees or even within a same tiny tree. In other words, embodiments vary to match the requirements of the particular application.

Figure 2B:
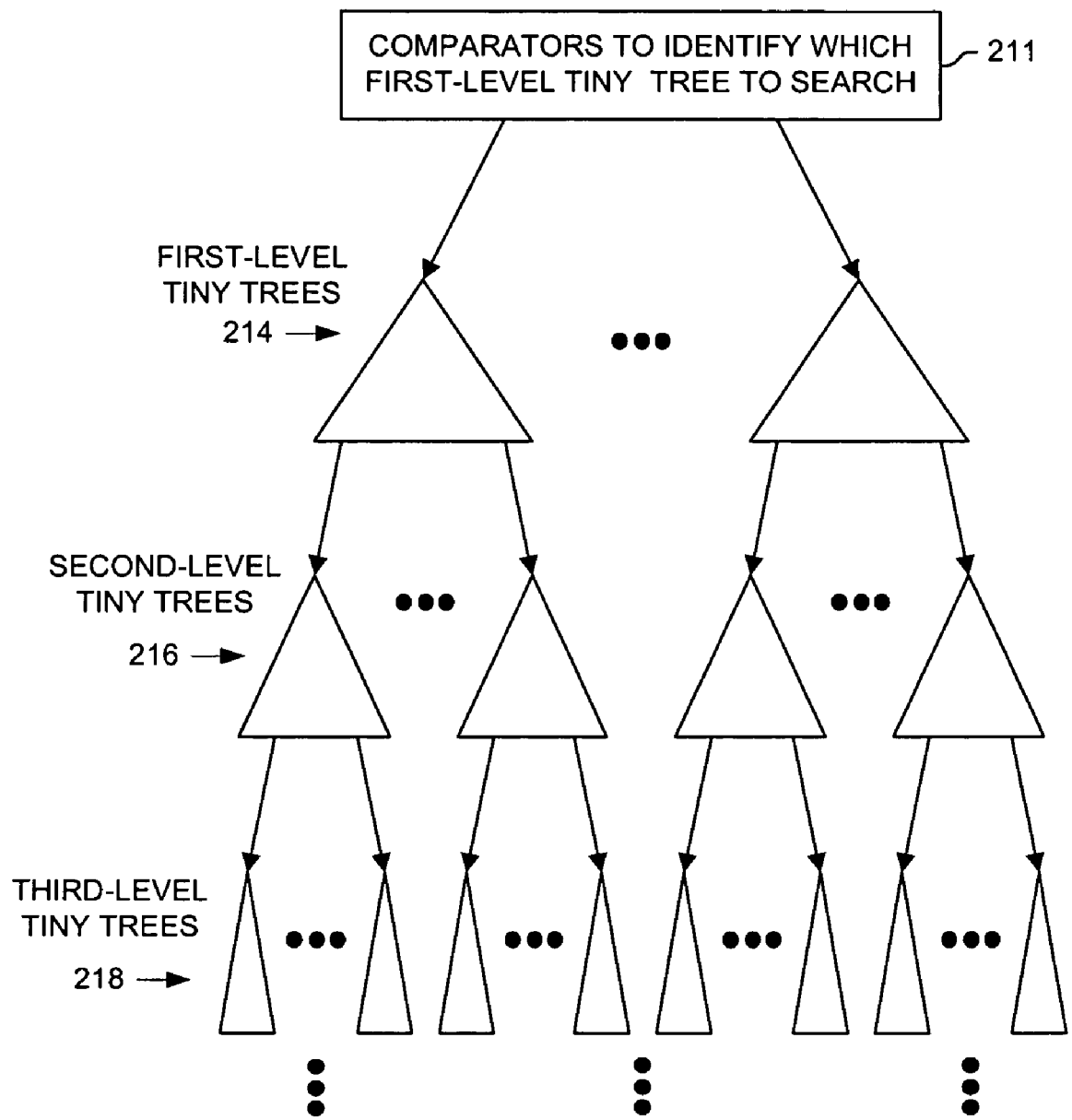
FIG. 2B is a block diagram illustrating ranges of tiny trees as used in one embodiment.

FIG. 2B illustrates a hierarchy of independent tiny trees 214, 216, and 218. In one embodiment, a set of comparators 211 is used to identity which particular tiny tree of first-level tiny trees 214 to first search for a lookup value. A tiny tree or other range identification mechanism is used in place of comparators 211 in one embodiment.

In one embodiment, the actual or expected total number of prefixes is evenly distributed across the lowest-level set of tiny trees. In such case, if P is the number of prefixes, and T is the number of trees (partitions), then the number of endpoints is 2P, and it is desirable to maintain between 2P/T to 4P/T endpoints in each lowest-level tiny tree to place a bound lookup times or then number of levels within a tiny tree.

Within a tiny tree, one embodiment uses a comparison based multi-way tree, and breaks up the keys in multiple columns for long keys so that the space occupied by the comparison values is reduced, thus increasing the branching factor. One embodiment further reduces the required amount of space by having a packed representation of siblings thus requiring only one pointer per node. Depending on the embodiment, when uni-column trees are used, a pointer may or may not be used.

Figure 2C:
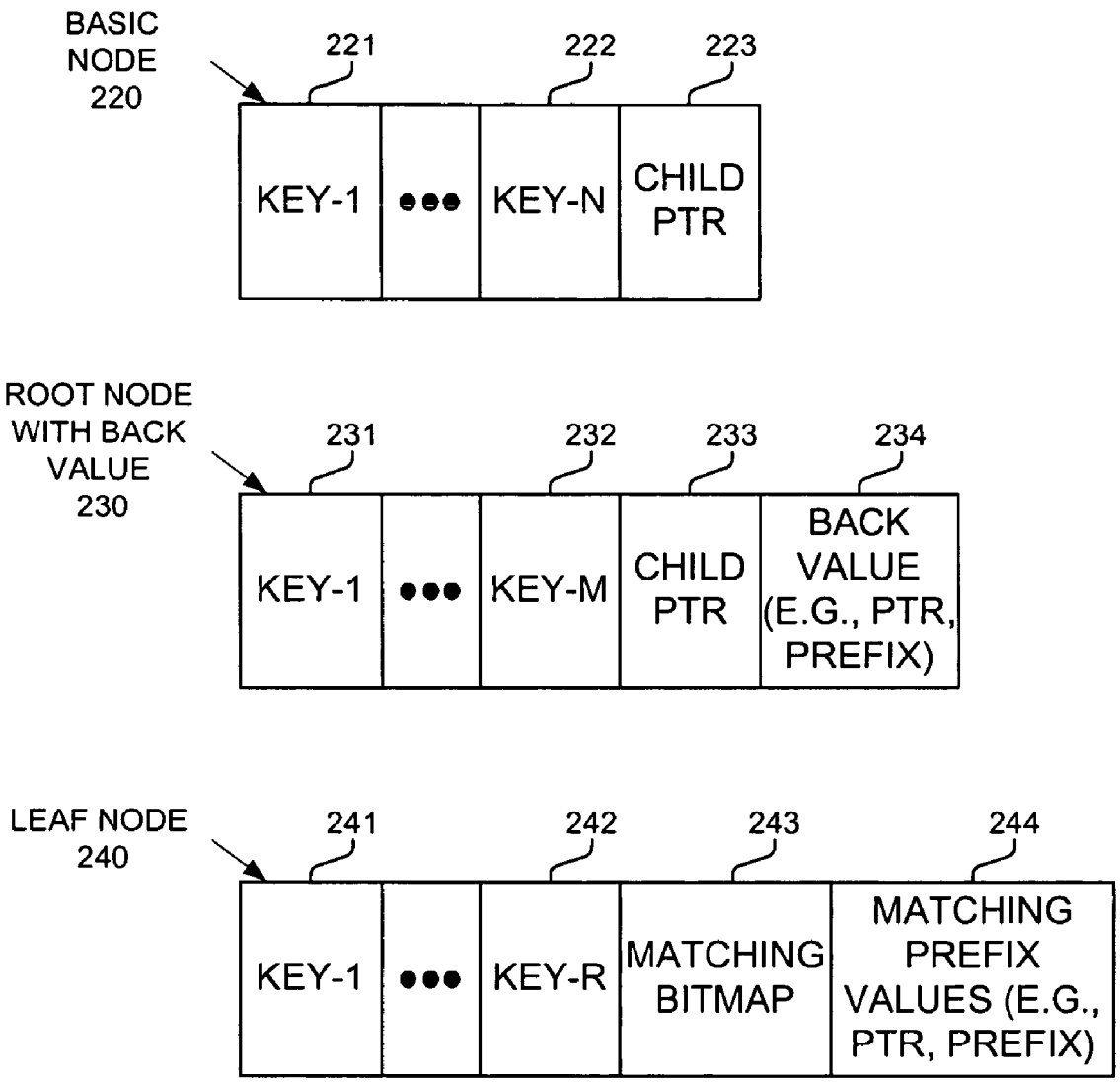
FIG. 2C is a block diagram illustrating nodes of one or more data structures in one embodiment.

FIG. 2C illustrates some different node types used in one embodiment. Of course, other embodiments use different node types and/or have different fields with a node type. As shown, basic node type includes multiple keys 221-222 and a child pointer 223. One embodiment stores all the children of a node contiguous so that by looking at the pointer to the first child, one can deduce the location of all the children. Keys 221-222 are comparison values. If the lookup value k is less than key-1, then the search continues to the child node located at the pointer. If it is between key-1 and key-2, then it goes to (pointer+one), similarly to (pointer+two) and (pointer+three), and so on. A similar representation is used for two-column trees except that nodes corresponding to the first column have seven children instead of four.

One embodiment uses a leaf node 240 to represent the prefixes identified within the associated tiny tree. As shown, leaf node 240 includes keys 241-242, a matching bitmap 243, and matching prefix values 244. The bitmap includes a bit for each possible matching prefix (e.g., the number of keys plus one as the corresponding child is identified based on a comparison of the lookup value with one or more keys 241-242), and identifies whether or not a particular child is present. Matching bitmap 243 is used to determine an offset, and the children present can be compacted or not compacted.

One embodiment identifies the prefix corresponding to each possible range (and thus the bitmap is typically not used or included in a child node). However, such a configuration may not be best suited for an embodiment that supports real-time updates of the search space, as the number of updates may be very large and resource consuming especially when a shorter prefix is added to the search space.

As such, one embodiment uses back values to identify those prefixes represented in the hierarchy outside the current tiny tree as described in relation to FIG. 2A. A root node 230 used in one embodiment is shown in FIG. 2C. As shown, root node 230 includes keys 231-232, a child pointer 233, and a back value 234. In one embodiment, back value 234 directly represents the longest matching prefix. In one embodiment, back value 234 is a pointer or reference value used in an indirect identification of the longest matching prefix. Thus, an update to a single value indirectly referenced by multiple back values 234 can update the longest matching prefix for multiple tiny intervals.

Figure 2D:
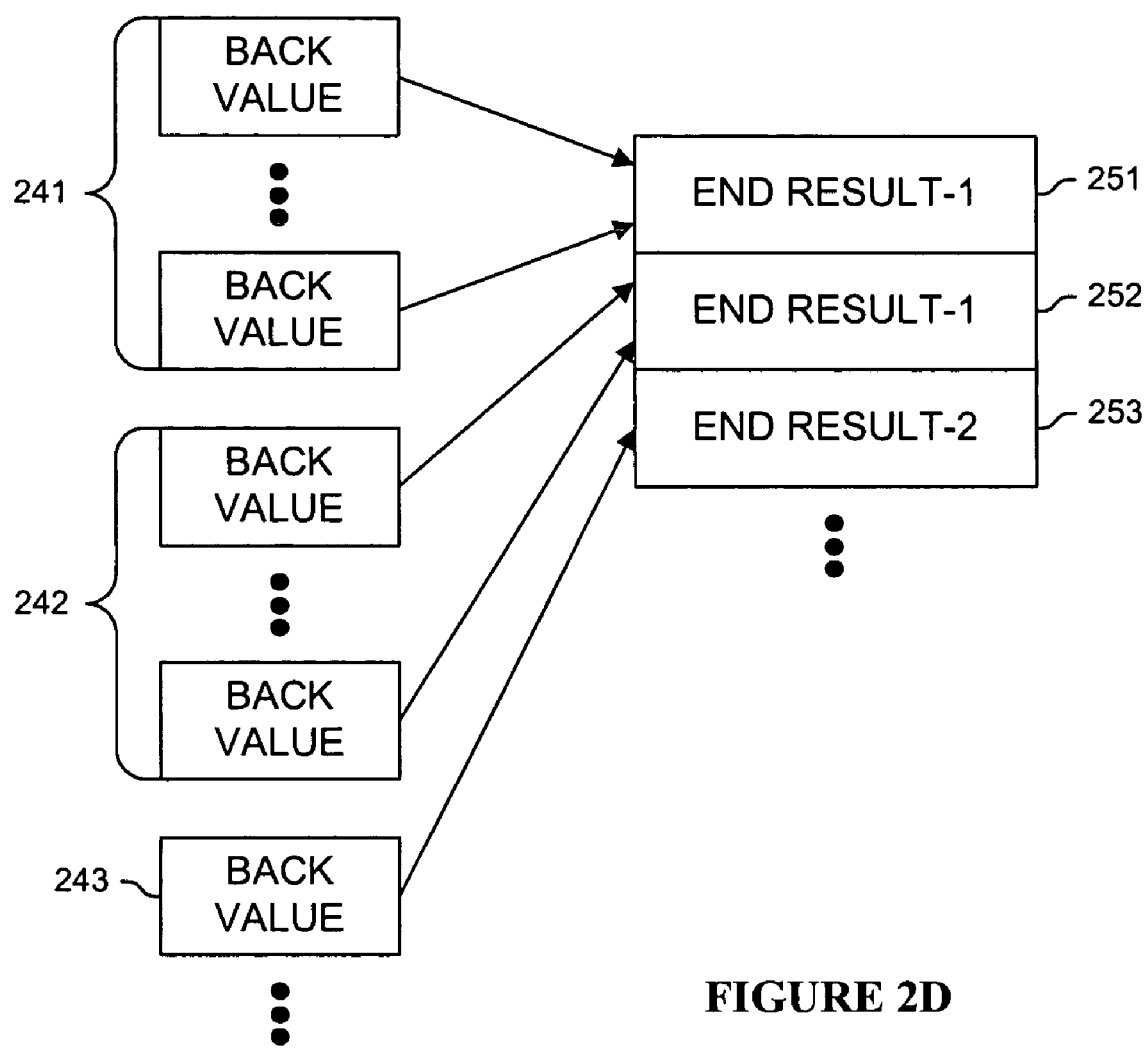
FIG. 2D is a block diagram illustrating back values of tiny trees directly identifying a longest matching prefix result as performed in one embodiment.

FIG. 2D is a block diagram illustrating back values 241-243 of tiny trees directly identifying a longest matching prefix result (i.e., end results 251-253) as performed in one embodiment. As shown, back values 241 reference end result-1 251, back values 242 reference end result-1 252, and back value 243 references end result-2 252. Multiple copies 251 and 252 of end result-1 are shown to illustrate that in one embodiment, the maximum number of tiny trees referencing a single result value is limited, so as to limit the maximum number of updates required by an insertion or deletion of a prefix. By appropriately grouping the back values into subsets 241 and 242, an insertion or deletion may possibly only change one result 251 or 252, and possibly require an additional one or more new end result values.

Figure 2E:
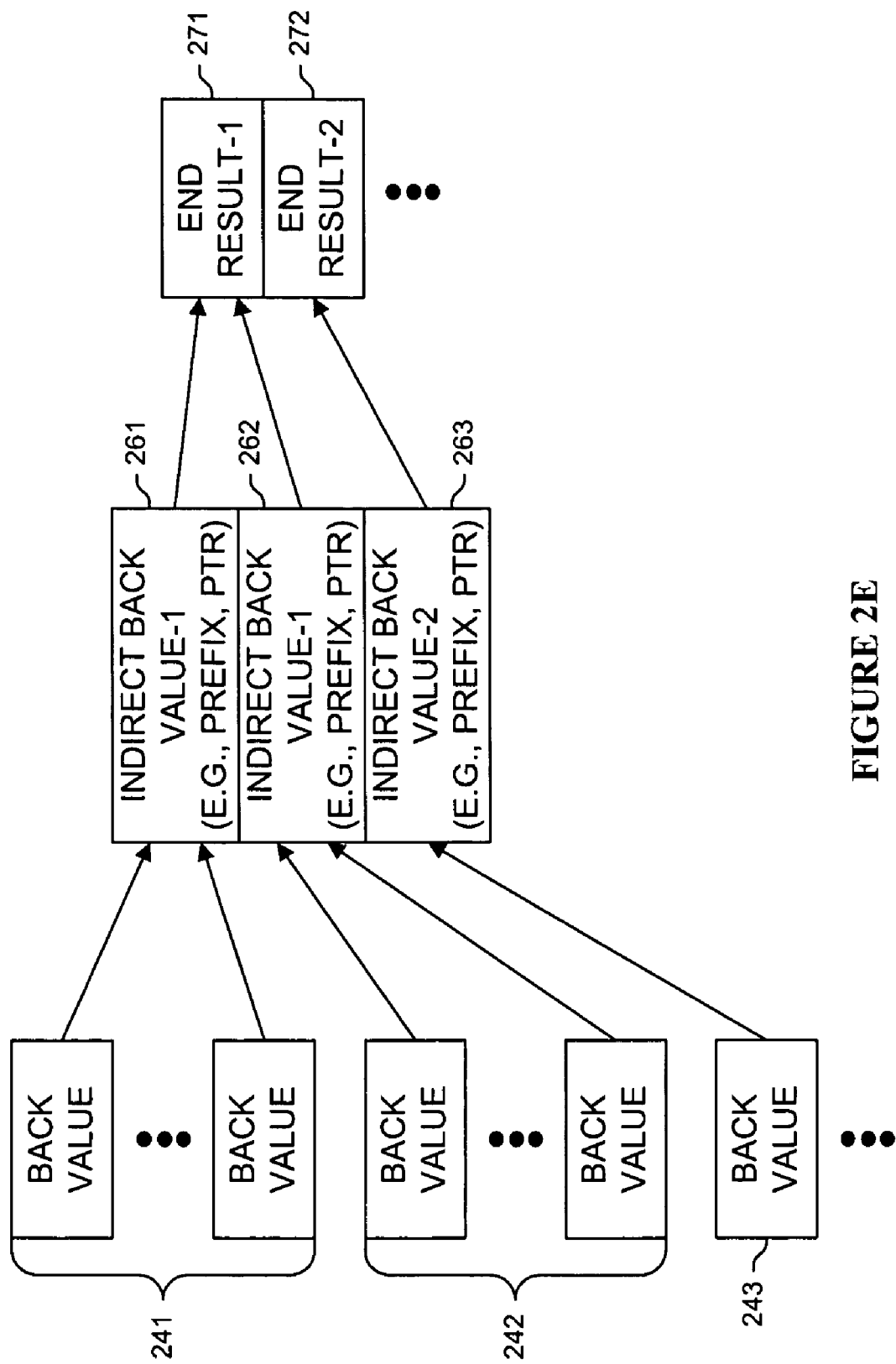
FIG. 2E is a block diagram illustrating back values of tiny trees indirectly identifying a longest matching prefix result as performed in one embodiment.

FIG. 2E is a block diagram illustrating back values 241-243 of tiny trees indirectly via indirect back values 261-263 identifying a longest matching prefix results 271-272 as performed in one embodiment. As shown, back values 241 reference indirect back value-1 261, back values 242 reference indirect back value-1 262, and back value 243 references indirect back value-2 263. Multiple copies 261 and 262 of indirect back value-1 are shown to illustrate that in one embodiment, the maximum number of tiny trees referencing a single indirect back value is limited, so as to limit the maximum number of updates required by an insertion or deletion of a prefix. By appropriately grouping the back values into subsets 241 and 242, an insertion or deletion may possibly only change one indirect back value 261 or 262, and possibly require an additional one or more new indirect back values and/or end result values. Note, one embodiment uses multiple copies of a same end result value, so as to limit the number of indirect back values that may need to be updated during an insertion or deletion.

Figure 3A:
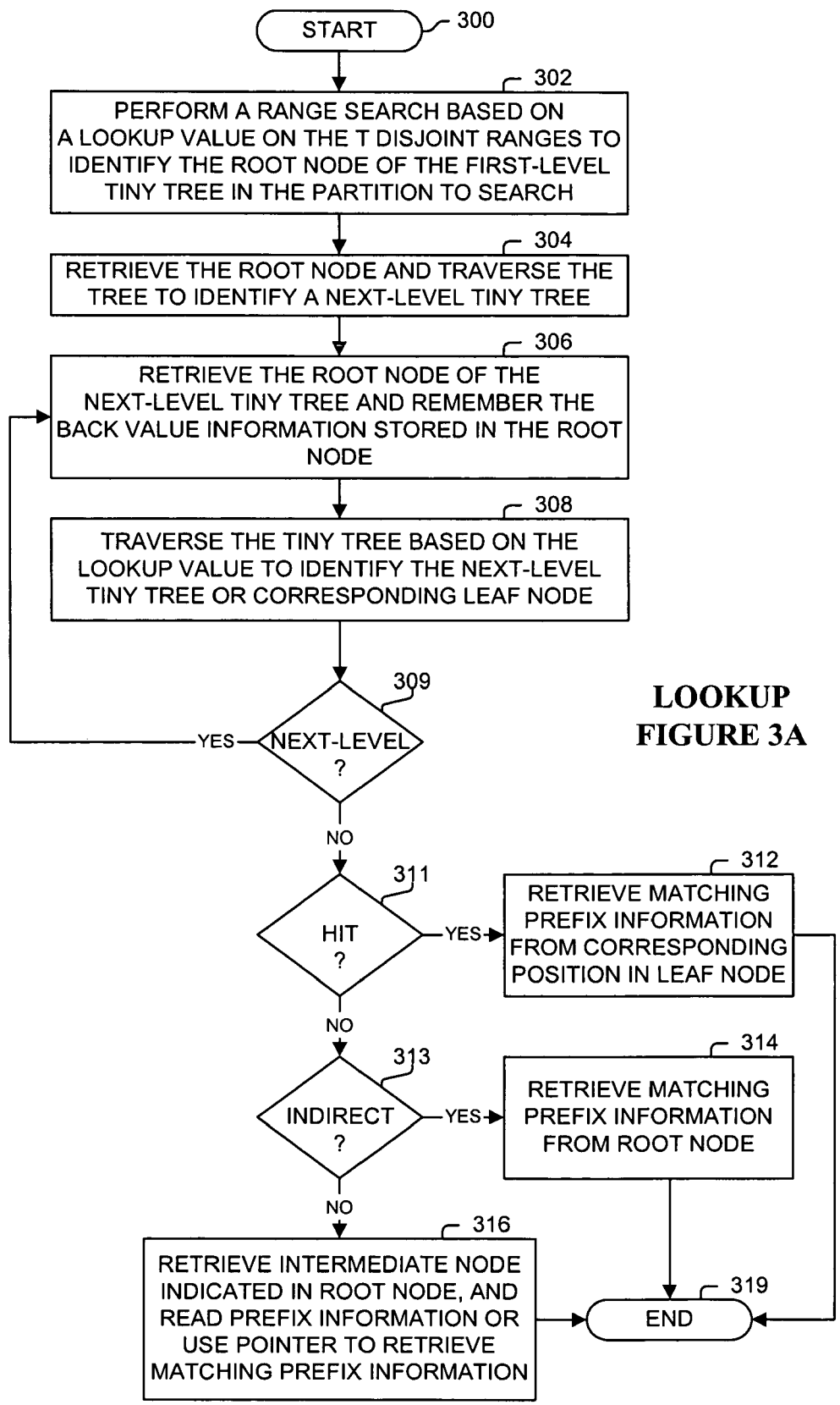
FIGS. 3A-D are flow diagrams illustrating processes used in one embodiment to search and maintain one or more data structures.

FIG. 3A illustrates a process used in one embodiment for performing a lookup operation on a hierarchy of independent tiny trees. Processing begins with process block 300, and proceeds to process block 302, wherein a range search is performed based on a lookup value on the T disjoint ranges to identify the root node of the partition to search. (Note, one embodiment allows the ranges to be overlapping). In process block 304, the root node of the first-level tiny tree in the identified, and in process block 304, its root node is retrieved. Note, in one embodiment, this root node may contain back value information, in which case, it is remembered. However, in one embodiment, no back value information is maintained at this level. The tiny tree is traversed to identify a next-level tiny tree. In process block 306, the root node of the identified tiny tree is retrieve, and the back value information is retained. In process block 306, the tiny tree is traversed based on the lookup value.

As determined in process block 309, if a next-level tiny tree is identified, then processing returns to process block 306. Otherwise, a leaf node was identified and retrieved. As determined in process block 311, if a longest matching prefix is identified in the leaf node, then in process block 312, the longest matching prefix information is retrieved and returned. Otherwise, the most recent back value information identifies the longest matching prefix. As determined in process block 313, if the back value includes the information, then in process block 314, the longest matching prefix is identified by the back value directly, and this value is returned. Otherwise, in process block 316, one or more intermediate nodes used to indirectly identify the longest matching prefix information corresponding to the back value are retrieved, and this prefix is returned. Processing is complete as indicated by process block 319.

Figure 3B:
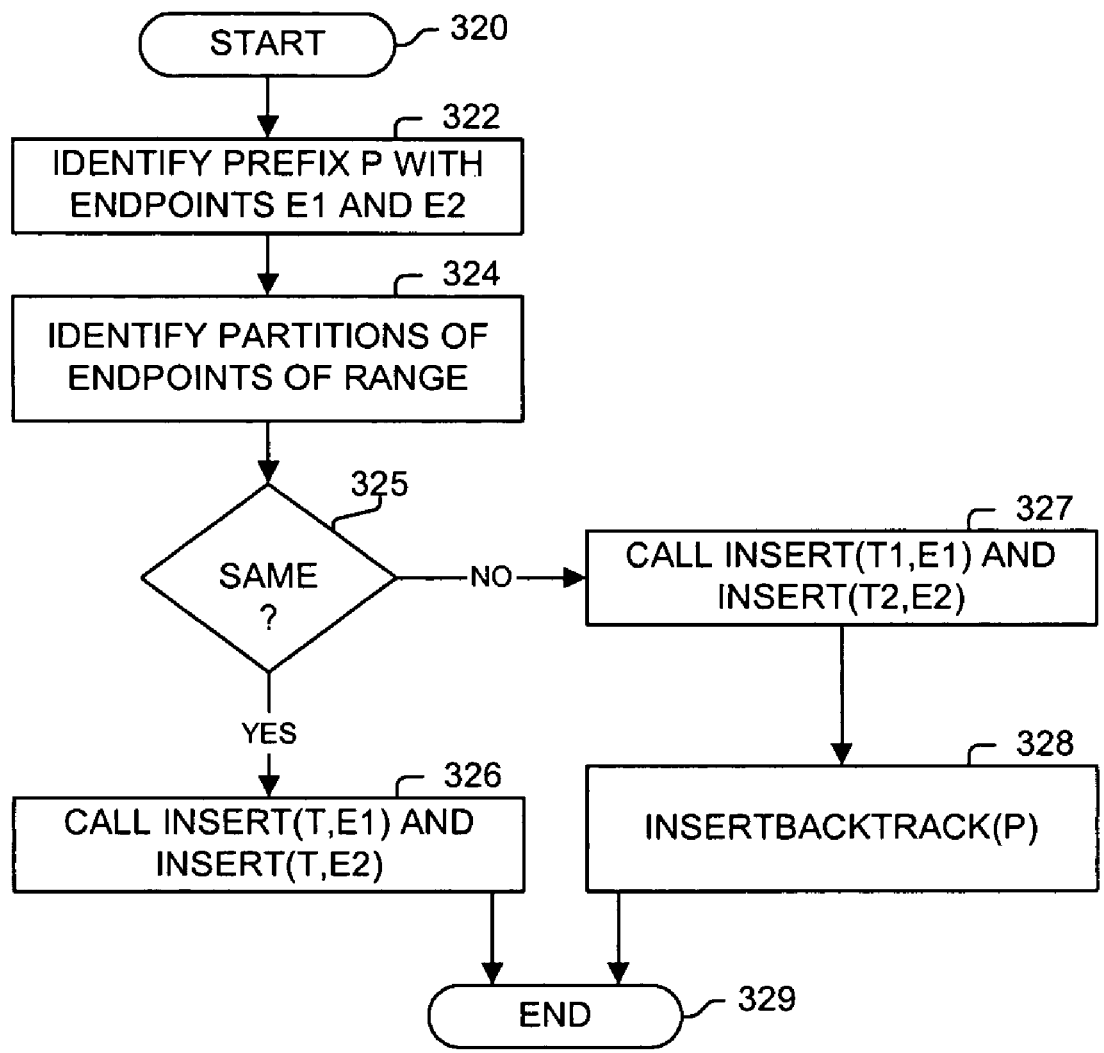
Figure 3C:
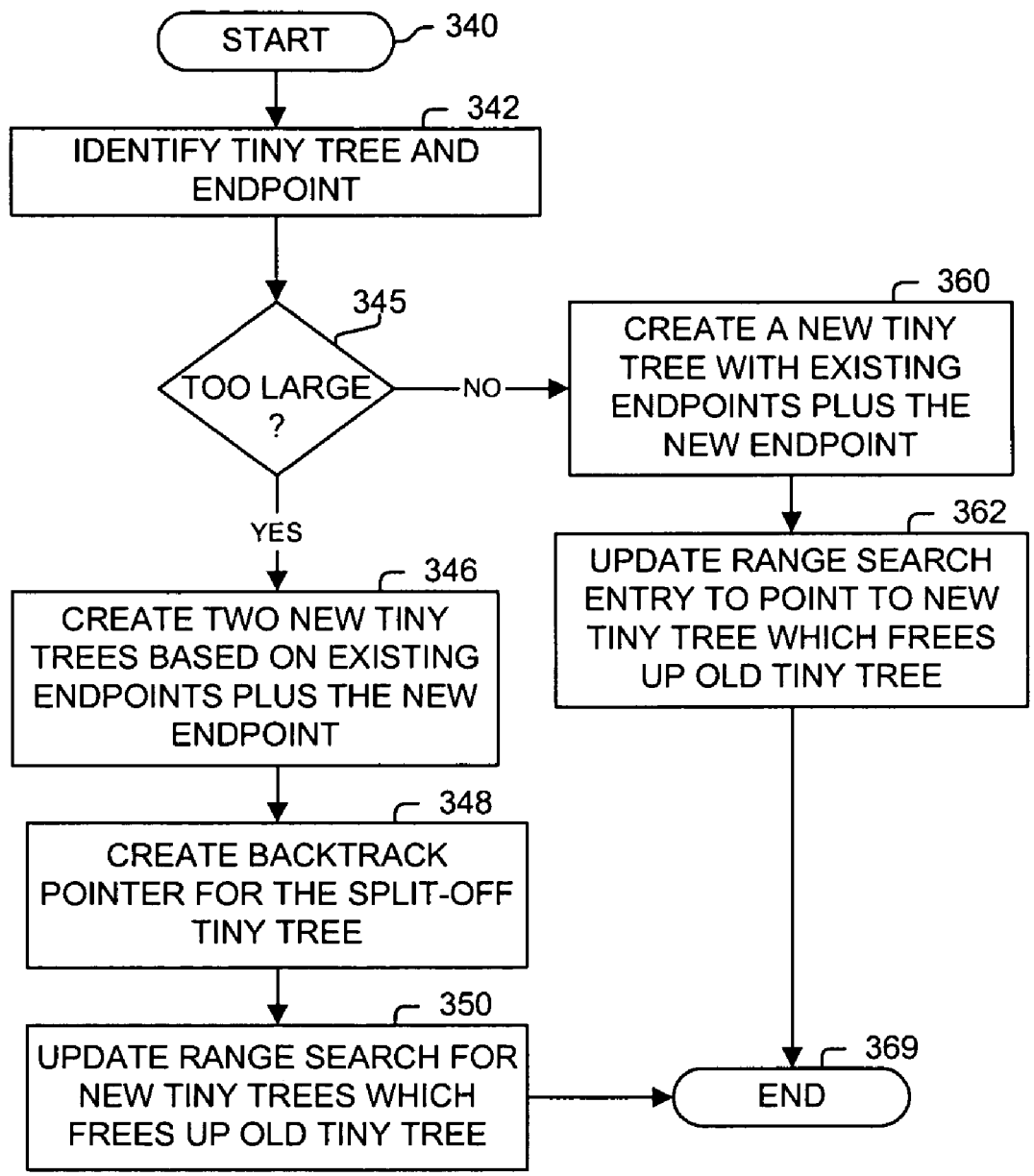

FIGS. 3B and 3C illustrate processes used in one embodiment to add endpoints to the hierarchy of independent tiny trees. Turning first to FIG. 3B, processing begins with process block 320, and proceeds to process block 322, wherein a prefix P and its corresponding interval endpoints E1 and E2 are identified. In process block 324, the partitions corresponding to E1 and E2 are identified. As determined in process block 325, if they are the same, then in process block 326, each endpoint is inserted into the same partition, such as using the process illustrated in FIG. 3C. Otherwise, in process block 327, each endpoint is inserted into its corresponding partition, such as using the process illustrated in FIG. 3C. Then, in process block 328, the back values are computed and added to the one or more data structures, such as using the process illustrated in FIG. 3D. Processing is complete as indicated by process block 389.

FIG. 3C illustrates a process used in one embodiment to insert an endpoint in a partition. Note, the process may update one or more of the tiny trees within the identified partition. Processing begins with process block 340, and proceeds to process block 342 wherein the tiny tree and endpoint are identified. As determined in process block 345, if the partition is too large, then in process block 346, the partition is split into two partitions. In order to update the one or more data structures concurrently, new tiny trees are created and then afterwards, they will be linked into the active part of the one or more data structures. As such two new tiny trees are created based on the existing endpoints plus the new endpoint. In process block 348, a back value is created for the split-off tiny tree, while the old back value typically remains the same for the old tiny tree. In process block 350, the range search entries (e.g., in the comparators or other partition identification mechanism) are updated to point to the new tiny trees with trees up the old tiny tree. Otherwise, in process block 360, a new tiny tree is created with the existing endpoints plus the new endpoint. In process block 362, the range search entry (e.g., in the comparators or other partition identification mechanism) is updated to point to the new tiny tree with frees up the old tiny tree.

Figure 3D:
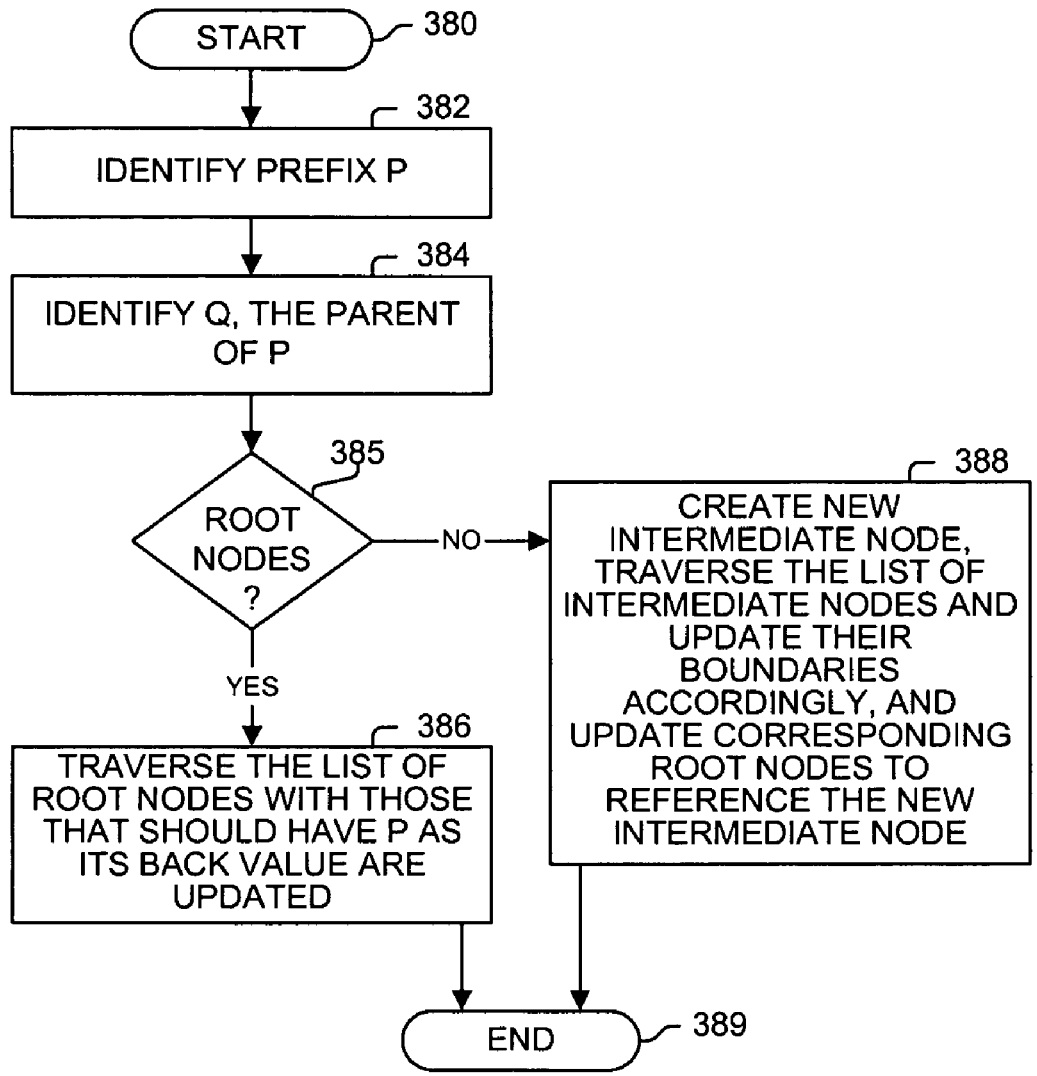

FIG. 3D illustrates a process used in one embodiment for adding a back value. In one embodiment, every parent prefix a list of either root nodes of tiny trees or a list of intermediate nodes are maintained. Intermediate nodes allow the update of a single value to affect multiple back values. With every intermediate node, its corresponding two boundary values and a linked list of root nodes is maintained. Processing begins with process block 380, and proceeds to process block 382, wherein a prefix P is identified. In process block 384, the parent Q of P is identified. As determined in process block 385, if Q's list is a list of root nodes, then in process block 386, the list is traversed and those that should have P as its back value are updated. Otherwise, in process block 388, a new intermediate node is created, the list of intermediate nodes are traversed to identify the boundaries of each intermediate node that needs to be changed and they are updated, and the appropriate root nodes are updated to indicated the new intermediate node. Processing is complete as indicated by process block 389.

Figure 4A:
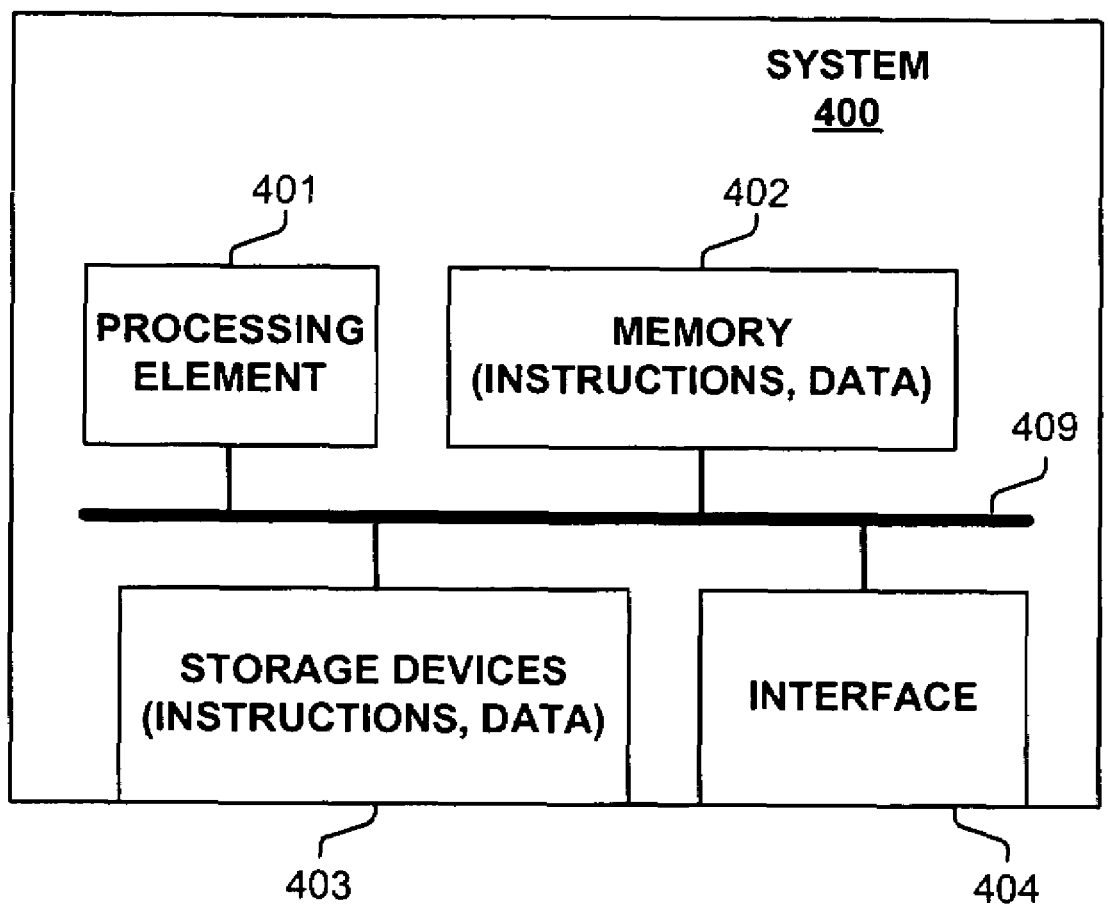
FIGS. 4A-D are block diagrams illustrating a small number of an unlimited number of possible architectures used by one embodiment.

FIG. 4A is a block diagram of a system or component 400 thereof, for running one or more processes, such as, but not limited to for updating on or more data structures, identifying a longest matching prefix based on a search of ranges corresponding to the prefixes, and/or other processes used in one embodiment. In one embodiment, system or component 400 performs one or more processes corresponding to one of the flow diagrams illustrated or otherwise described herein.

In one embodiment, component 400 includes a processing element 401, memory 402, storage devices 403, and an interface 404 for sending and receiving packets, items, and/or other information, which are typically coupled via one or more communications mechanisms 409 (shown as a bus for illustrative purposes.) Various embodiments of component 400 may include more or less elements. The operation of component 400 is typically controlled by processing element 401 using memory 402 and storage devices 403 to perform one or more tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processing element 401 and/or data which is manipulated by processing element 401 for implementing functionality in accordance with an embodiment. Storage devices 404 are another type of computer-readable medium, and typically comprise solid state storage media, disk drives, diskettes, networked services, tape drives, and other storage devices. Storage devices 403 typically store computer-executable instructions to be executed by processing element 401 and/or data which is manipulated by processing element 401 for implementing functionality in accordance with an embodiment.

Figure 4B:
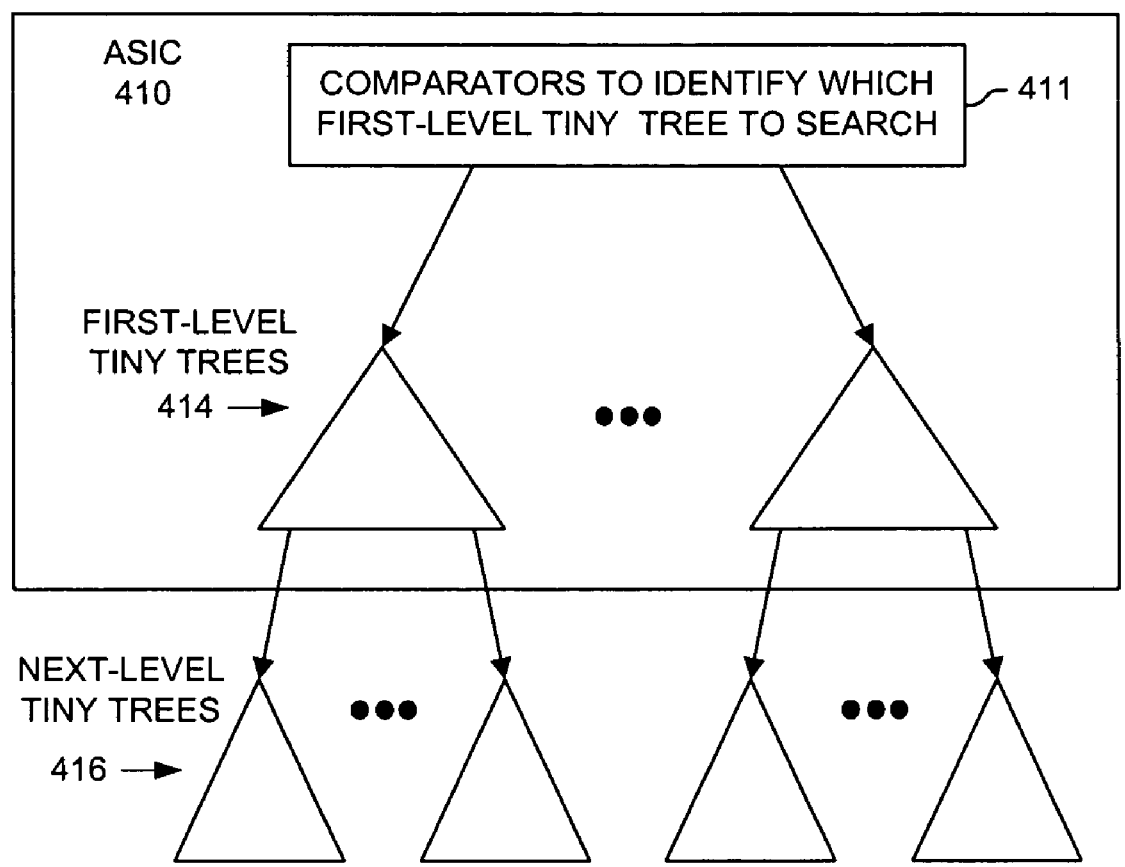

FIG. 4B is a block diagram illustrating an architecture used in one embodiment used in identifying a longest matching prefix based on a search of intervals corresponding to the prefixes. As shown, applications-specific integrated circuit (ASIC) 410 includes a et of comparators used to identify which of the first-level tiny trees 414 stored in memory in ASIC 410 to traverse based on a lookup value. Next-level tiny trees 416 are stored in an external memory. In one embodiment, multiple levels of tiny trees are stored in memory in ASIC 410, and no external memory is required or one or more additional tree levels are stored in external memory. In one embodiment, all tiny trees are stored in memory external to ASIC 410.

Figure 4C:
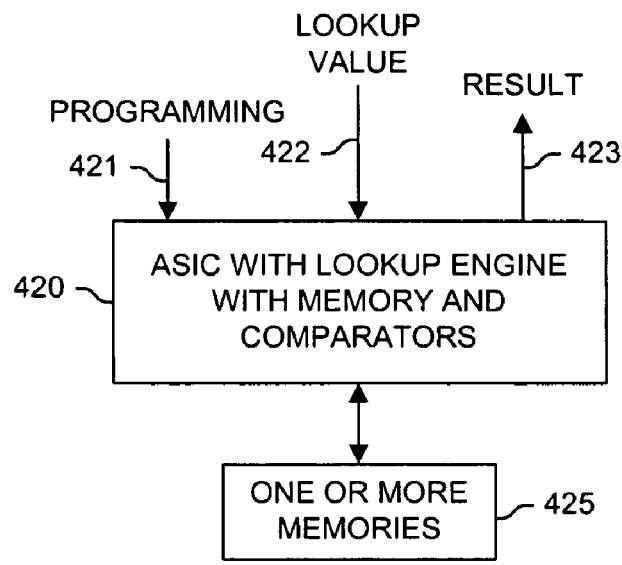

FIG. 4C is a block diagram illustrating an architecture used in one embodiment used in identifying a longest matching prefix based on a search of intervals corresponding to the prefixes. As shown, ASIC 420 includes a lookup engine, internal memory, and comparators. ASIC 420 is programmed via signal 421. ASIC 420 receives a lookup value 422, determines the longest matching prefix of the programmed prefixes, which it returns as result 423. One or more programmed levels of tiny trees are stored in one or more memories 425.

Figure 4D:
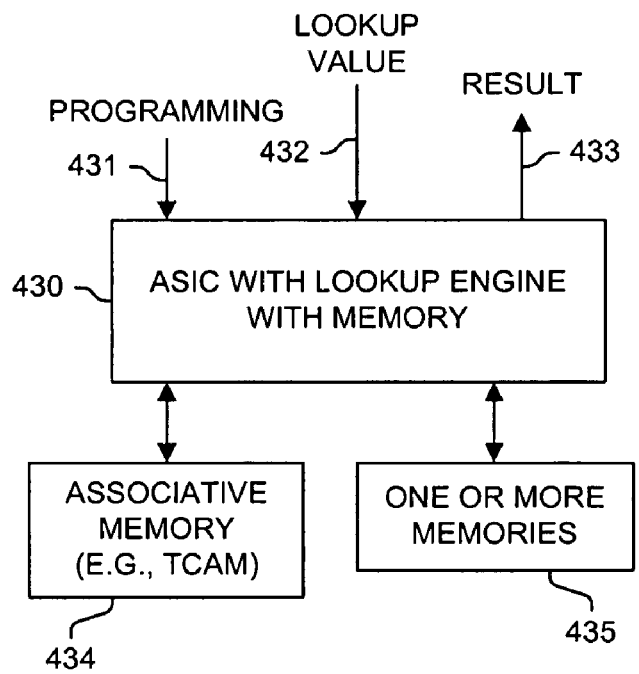

FIG. 4D is a block diagram illustrating an architecture used in one embodiment used in identifying a longest matching prefix based on a search of intervals corresponding to the prefixes. As shown, ASIC 430 includes a lookup engine and internal memory. ASIC 430 is programmed via signal 431. ASIC 430 receives a lookup value 432, determines the longest matching prefix of the programmed prefixes, which it returns as result 433. ASIC 430 performs a lookup operation based on lookup value 432 in associative memory 434 to identify which range of tiny trees to traverse, with the tiny trees stored in internal memory and one or more external memories 435.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for determining a longest matching prefix, the apparatus comprising:

an external memory for storing one or more non-first-level tiny trees; and an applications specific integrated circuit (ASIC) including a lookup engine and internal memory for storing a set of first-level tiny trees, the ASIC configured to perform operations, said operations including:

determining which particular first-level tiny tree of a plurality of first-level tiny trees to search based on a lookup value on T disjoint ranges defined by endpoints of prefixes represented by said first-level tiny trees and said one or more non-first-level tiny trees, with the endpoint of a fully expanded prefix of said represented prefixes being the value of the fully expanded prefix itself and the endpoints of a non-fully expand prefix being the non-fully expand prefix fully expanded with zeros and the non-fully expand prefix fully expanded with ones, with each of said T disjoint ranges including substantially the same number of said endpoints;

retrieving a first-level root node of said particular first-level tiny tree from said internal memory, the first-level root node including a first-level plurality of keys defining a plurality of tiny intervals, wherein a tiny interval is a range defined by two consecutive keys;

traversing said particular first-level tiny tree stored in said internal memory to identify a next-level tiny tree, said traversing said particular first-level tiny tree including comparing the lookup value with one or more of the first-level plurality of keys defining a plurality of tiny intervals, wherein the first-level tiny tree and the next-level tiny tree are independent trees;

retrieving a root node of the next-level tiny tree stored in the external memory, the root node including a plurality of keys, defining a plurality of tiny intervals, to compare with the lookup value and a back value to identify a matching prefix should no matching prefix be identified within said particular tree;

traversing said particular next-level tiny tree stored in the external memory to either identify a matching prefix or a no match condition, said traversing said particular next-level tiny tree including comparing the lookup value with one or more of the plurality of keys defining a plurality of tiny intervals; and identifying as the longest matching prefix a prefix identified based on the back value if said traversing resulted in said no match condition else the matching prefix.

2. The apparatus of claim 1, comprising an associative memory, wherein said determining which particular first-level tiny tree of a plurality of first-level tiny trees to search based on a lookup value includes performing a lookup operation on the associative memory based on the lookup value.

3. A method for identifying a longest matching prefix, the method comprising:

determining which particular first-level tiny tree of a plurality of first-level tiny trees to search based on a lookup value on T disjoint ranges defined by endpoints of prefixes represented by said first-level tiny trees and said one or more non-first-level tiny trees, with the endpoint of a fully expanded prefix of said represented prefixes being the value of the fully expanded prefix itself and the endpoints of a non-fully expand prefix being the non-fully expand prefix fully expanded with zeros and the non-fully expand prefix fully expanded with ones, with each of said T disjoint ranges including substantially the same number of said endpoints;

retrieving a first-level root node of said particular first-level tiny tree, the first-level root node including a first-level plurality of keys defining a plurality of tiny intervals, wherein a tiny interval is a range defined by two consecutive keys;

traversing said particular first-level tiny tree to identify a next-level tiny tree, said traversing said particular first-level tiny tree including comparing the lookup value with one or more of the first-level plurality of keys defining a plurality of tiny intervals, wherein the first-level tiny tree and the next-level tiny tree are independent trees;

retrieving a root node of the next-level tiny tree, the root node including a plurality of keys, defining a plurality of tiny intervals, to compare with the lookup value and a back value to identify a matching prefix should no matching prefix be identified within said particular tree;

traversing said particular next-level tiny tree to either identify a matching prefix or a no match condition, said traversing said particular next-level tiny tree including comparing the lookup value with one or more of the plurality of keys defining a plurality of tiny intervals; and identifying and storing as the longest matching prefix a prefix identified based on the back value if said traversing resulted in said no match condition else the matching prefix.

4. The method of claim 3, wherein the first-level tiny tree is associated with no back values.

5. A tangible computer-readable medium storing therein computer-executable instructions for performing steps for identifying a longest matching prefix, said steps comprising:

determining which particular first-level tiny tree of a plurality of first-level tiny trees to search based on a lookup value on T disjoint ranges defined by endpoints of prefixes represented by said first-level tiny trees and said one or more non-first-level tiny trees, with the endpoint of a fully expanded prefix of said represented prefixes being the value of the fully expanded prefix itself and the endpoints of a non-fully expand prefix being the non-fully expand prefix fully expanded with zeros and the non-fully expand prefix fully expanded with ones, with each of said T disjoint ranges including substantially the same number of said endpoints;

retrieving a first-level root node of said particular first-level tiny tree, the first-level root node including a first-level plurality of keys defining a plurality of tiny intervals, wherein a tiny interval is a range defined by two consecutive keys;

traversing said particular first-level tiny tree to identify a next-level tiny tree, said traversing said particular first-level tiny tree including comparing the lookup value with one or more of the first-level plurality of keys defining a plurality of tiny intervals, wherein the first-level tiny tree and the next-level tiny tree are independent trees;

retrieving a root node of the next-level tiny tree, the root node including a plurality of keys, defining a plurality of tiny intervals, to compare with the lookup value and a back value to identify a matching prefix should no matching prefix be identified within said particular tree;

traversing said particular next-level tiny tree to either identify a matching prefix or a no match condition, said traversing said particular next-level tiny tree including comparing the lookup value with one or more of the plurality of keys defining a plurality of tiny intervals; and identifying as the longest matching prefix a prefix identified based on the back value if said traversing resulted in said no match condition else the matching prefix.

6. An apparatus for identifying a longest matching prefix, the apparatus comprising:

means for determining which particular first-level tiny tree of a plurality of first-level tiny trees to search based on a lookup value on T disjoint ranges defined by endpoints of prefixes represented by said first-level tiny trees and said one or more non-first-level tiny trees, with the endpoint of a fully expanded prefix of said represented prefixes being, the value of the fully expanded prefix itself and the endpoints of a non-fully expand prefix being the non-fully expand prefix fully expanded with zeros and the non-fully expand prefix fully expanded with ones, with each of said T disjoint ranges including substantially the same number of said endpoints;

means for retrieving a first-level root node of said particular first-level tiny tree, the first-level root node including a first-level plurality of keys defining a plurality of tiny intervals, wherein a tiny interval is a range defined by two consecutive keys;

means for traversing said particular first-level tiny tree to identify a next-level tiny tree, said traversing said particular first-level tiny tree including comparing the lookup value with one or more of the first-level plurality of keys defining a plurality of tiny intervals, wherein the first-level tiny tree and the next-level tiny tree are independent trees;

means for retrieving a root node of the next-level tiny tree, the root node including a plurality of keys, defining a plurality of tiny intervals, to compare with the lookup value and a back value to identify a matching prefix should no matching prefix be identified within said particular tree;

means for traversing said particular next-level tiny tree to either identify a matching prefix or a no match condition, said traversing said particular next-level tiny tree including comparing the lookup value with one or more of the plurality of keys defining a plurality of tiny intervals; and means for identifying as the longest matching prefix a prefix identified based on the back value if said traversing resulted in said no match condition else the matching prefix.

7. An apparatus comprising one or more processors and a memory, wherein the memory stores one or more instructions that, when executed by the one or more processors, perform the operations of:

determining which particular first-level tiny tree of a plurality of first-level tiny trees to search based on a lookup value on T disjoint ranges defined by endpoints of prefixes represented by said first-level tiny trees and said one or more non-first-level tiny trees, with the endpoint of a fully expanded prefix of said represented prefixes being the value of the fully expanded prefix itself and the endpoints of a non-fully expand prefix being the non-fully expand prefix fully expanded with zeros and the non-fully expand prefix fully expanded with ones, with each of said T disjoint ranges including substantially the same number of said endpoints;

retrieving a first-level root node of said particular first-level tiny tree, the first-level root node including a first-level plurality of keys defining a plurality of tiny intervals, wherein a tiny interval is a range defined by two consecutive keys;

traversing said particular first-level tiny tree to identify a next-level tiny tree, said traversing said particular first-level tiny tree including comparing the lookup value with one or more of the first-level plurality of keys defining a plurality of tiny intervals, wherein the first-level tiny tree and the next-level tiny tree are independent trees;

retrieving a root node of the next-level tiny tree, the root node including a plurality of keys, defining a plurality of tiny intervals, to compare with the lookup value and a back value to identify a matching prefix should no matching prefix be identified within said particular tree;

traversing said particular next-level tiny tree to either identify a matching prefix or a no match condition, said traversing said particular next-level tiny tree including comparing the lookup value with one or more of the plurality of keys defining a plurality of tiny intervals; and identifying as the longest matching prefix a prefix identified based on the back value if said traversing resulted in said no match condition else the matching prefix.

8. The apparatus of claim 7, wherein the first-level tiny tree is associated with no back values.

* * * * *